(12) United States Patent
Burcaw

(10) Patent No.: US 6,340,084 B1
(45) Date of Patent: Jan. 22, 2002

(54) LUMBER STAGING DEVICE

(76) Inventor: Terry E. Burcaw, 11014 Lapaz Ct., Spring Hill, FL (US) 34608

( * ) Notice: Subject to any disclaimer, the term of this patent is extended or adjusted under 35 U.S.C. 154(b) by 0 days.

(21) Appl. No.: 09/471,294

(22) Filed: Dec. 24, 1999

(51) Int. Cl.[7] .......................... B65G 42/26; B65G 47/68
(52) U.S. Cl. ...................................... 198/435; 198/817
(58) Field of Search ................................ 198/435, 817; 414/22, 285; 209/931, 517, 518, 519, 520, 521

(56) References Cited

U.S. PATENT DOCUMENTS

| | | | | |
|---|---|---|---|---|
| 1,192,832 A | * | 7/1916 | Sherman | 198/415 X |
| 1,277,326 A | * | 8/1918 | Lohman | 209/531 X |
| 1,441,661 A | * | 1/1923 | Church | 198/435 |
| 1,809,456 A | * | 6/1931 | Streeter | 198/435 |
| 1,860,679 A | * | 5/1932 | Lockhart et al. | 198/861.5 X |
| 1,923,548 A | * | 8/1933 | Mason | 198/75 X |
| 2,613,825 A | * | 10/1952 | Setzer et al. | 214/11 X |
| 3,050,200 A | * | 8/1962 | Sempelcamp | 214/16.6 X |
| 3,557,952 A | * | 1/1971 | Heikinheimo | 115/17 X |
| 4,269,303 A | * | 5/1981 | Cornell | 198/688 X |
| 4,470,741 A | * | 9/1984 | Bossler et al. | 414/280 X |

FOREIGN PATENT DOCUMENTS

| | | | | |
|---|---|---|---|---|
| SE | 7708049 A | * | 3/1979 | B65G/65/28 |

* cited by examiner

Primary Examiner—Christopher P. Ellis
Assistant Examiner—Kenneth W Bower
(74) Attorney, Agent, or Firm—Arthur W Fisher, III

(57) ABSTRACT

A lumber staging device having a lumber receiving station and a lumber discharge station for positioning a supply of lumber of different lengths within arms reach of an operator of an automated saw. The lumber staging device comprises a first multi-level lumber conveying assembly including a first set of substantially horizontal conveyors and a second multi-level lumber conveying assembly including a second set of substantially horizontal conveyors to form multi-level pairs of corresponding substantially horizontal conveyors. The multi-level pairs include a lower conveyor assembly, an intermediate conveyor assembly and an upper conveyor assembly to convey lumber supported respectively thereon. Each conveyor assembly is operatively coupled to a corresponding conveyor drive to selectively convey lumber supported therebetween from the lumber receiving station to the lumber discharge station.

24 Claims, 3 Drawing Sheets

LUMBER STAGING DEVICE

BACKGROUND OF THE INVENTION

1. Field of the Invention

A lumber staging device to selectively position a supply of lumber of select dimensions within arms reach of an operator of an automated saw.

2. Description of the Prior Art

Typically in cutting lumber workers manually pull the lumber pieces from an elongated conveyor on which the lumber are carried in a transverse position. This work is labor intensive and extremely tiring. Thus, there is a need to mechanize and automate the handling of the lumber as much as is practical.

U.S. Pat. No. 4,269,303 teaches a conveyor for transporting wood slabs comprising a plurality of spaced-apart rails each carrying an endless loop of chain routed around a respective drive sprocket and an idler roller, and a plurality of further idler rollers support the upper course of the chain above the upper edges of the rails. Each chain comprises inter-linked oval links, so that the links lie in perpendicular planes, with links lying in vertical planes extending into recesses in the sprockets and idler rollers.

U.S. Pat. No. 3,557,952 shows an apparatus for handling timber of comprising an elongated conveyor for carrying timber pieces, a plurality of storage pockets placed at one side of the conveyor and mechanical means for the automatic transfer of each timber piece to a selected storage pocket according to the dimension and/or quality class of the timber piece concerned.

U.S. Pat. No. 3,050,200 discloses a process for the stacking sheet material and an apparatus for the stacking of sheets for processing in multi-level presses.

U.S. Pat. No. 2,613,825 relates to an apparatus for sorting green lumber as cut in a sawmill according to size or grade.

U.S. Pat. No. 2,017,535 discloses an apparatus for handling and transferring the mat board from a mat forming unit to a press.

U.S. Pat. No. 1,923,548 shows an article handling system comprising a rack to support a number of endless conveyors one above the other. The boards are received on a specially constructed carrier. This carrier may be tilted; that is, the outer end of the carrier is moveable up and down so that it may be brought into position to register with any one of the endless conveyors on the receiving rack. In operation a board travels over the tilting carrier and is received by one of the conveyors on the received by one of the conveyors on receiving rack. The operator then shifts the tilting carrier so that another of the conveyors on the receiving rack will receive the next board. In this manner the receiving rack can be filled with boards.

U.S. Pat. No. 1,860,679 relates to tipple conveyor for transferring articles, such as pieces of composition board, from one conveyor to one or more other conveyors arranged at different levels with respect to the first conveyor and each other.

U.S. Pat. No. 1,809,456 teaches an apparatus for delivering sheets from a press or other apparatus to various decks of multiple deck dryer.

U.S. Pat. No. 1,441,661 shows the invention providing a suitable mechanism partially or wholly automatic in character whereby successive pallets may be received at one end of a series of such drying racks and deposited in properly spaced relation.

U.S. Pat. No. 1,192,832 discloses a conveyor for conducting strips of lumber from one place to another. One side of conveyor will travel faster than the other as to move the strips of lumber to an oblique position which causes the lumber to overlap each other permitting more lumber to fed to destination faster than ordinary construction.

Canadian 2,053,993 shows a tool and method for use in conjunction with chain conveyors of the type for transporting lumber from one workstation to another. Lugs spaced along the chains usually remain in transverse alignment and usually similarly orient the lumber, but the chains sometimes become desynchronized, causing the lugs to become misaligned, and the lumber unoriented on the conveyor. The tool is clamped on the drive sprocket of the chain that is out of synchronism and the sprocket is rotated, causing the chain to advance one tooth for each revolution. Rotation is continued until the de-synchronized chain is again synchronized with adjacent chains, and the lugs carried by the chains again transversely aligned.

Swiss 7,708,049 teaches the timber conveyor system which has a horizontal transverse first conveyor. A second transverse conveyor is located directly above the first conveyor, and is shorter than the first conveyor. The second conveyor can be swung about a horizontal axis passing through its middle. It can be adjusted either so that it moves parallel to the first conveyor, or so that one of its ends swings down to cooperate with the first conveyor. One end of the second conveyor can receive timber from the first conveyor, and the second end can deliver timber to the first conveyor.

SUMMARY OF THE INVENTION

The present invention relates to a lumber staging device comprising a first multi-level lumber conveying assembly including a plurality of vertically stacked substantially horizontal conveyors mounted on a corresponding conveyor support frame and a second multi-level conveying assembly including a second plurality of vertically stacked substantially horizontal conveyors mounted on a corresponding conveyor support frame disposed on opposite sides of the lumber stage drive for positioning a supply of lumber of different lengths within arms length of an operator of an automated saw or other lumber processing equipment.

The first and second multi-level lumber conveying assemblies each comprises a first or lower, a second or intermediate and a third or upper substantially horizontal conveyor such that the corresponding substantially horizontal conveyors of the first and second multi-level conveying assemblies are substantially parallel to each other to cooperatively form a first or lower conveyor assembly, a second or intermediate conveyor assembly and a third or upper conveyor assembly respectively to support lumber thereon.

The width of the third or upper conveyor assembly is greater than the width of the second or intermediate conveyor assembly which is greater than the width of the first or lower conveyor assembly. The length of the first or lower conveyor assembly is greater than the length of the second or intermediate conveyor assembly which is greater than the length of the third or upper conveyor assembly.

Each substantially horizontal conveyor in the first multi-level lumber conveying assembly and the corresponding substantially horizontal conveyor in the second multi-level lumber conveying assembly are affixed in spaced relationship relative to each other to cooperatively form a lower conveyor assembly, an intermediate conveyor assembly and an upper conveyor assembly.

Each conveyor assembly is operatively coupled to a corresponding conveyor drive. Each conveyor drive includes a lumber conveying chain operatively coupled to a positioning sprocket disposed at the lumber receiving end portion of the corresponding conveyor assembly and a drive sprocket disposed at the lumber discharge end portion of the corresponding conveyor assembly. Each positioning sprocket is affixed to a shaft rotatably supported by a sprocket support assembly disposed on opposite sides of the corresponding conveyor assembly. Each sprocket support assembly further includes a sprocket positioning member to position the corresponding sprocket support assembly relative to the lumber receiving end portion.

Each conveyor drive further includes a drive sprocket each operatively coupled to the corresponding lumber conveying chain affixed to opposite end portions of a corresponding drive shaft operatively coupled to a motor. With the rotation of the drive shaft, the corresponding lumber conveying chains of the conveyor assembly moves lumber from lumber receiving station at the lumber receiving end to the lumber discharge station at the lumber discharge end.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
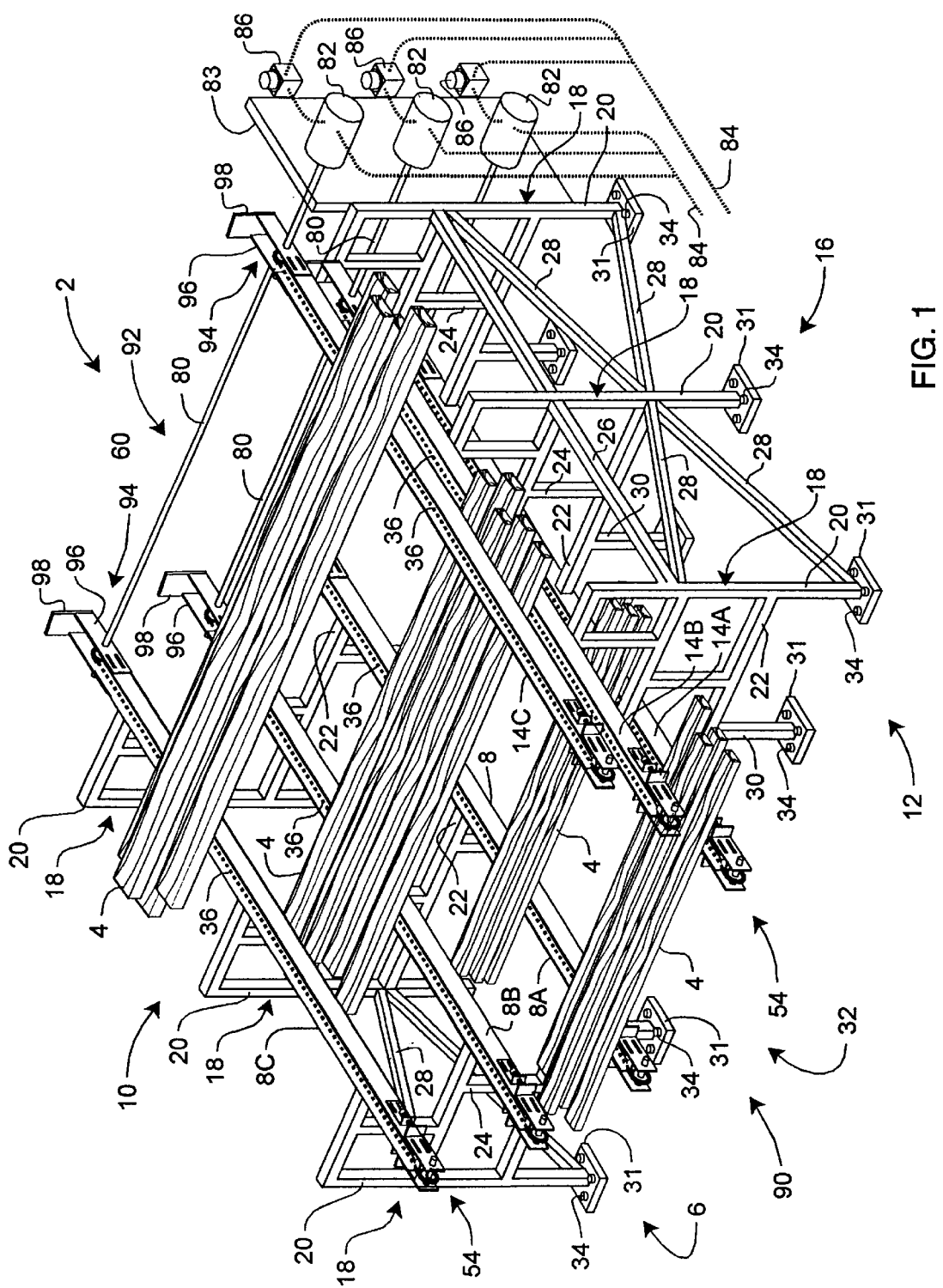
FIG. 1 is a perspective view of the lumber staging device of the present invention.

As best shown in FIG. 1, the present invention relates to a lumber staging device generally indicated as 2 for positioning a supply of lumber 4 of different lengths within arms length of an operator of an automated saw or other lumber processing equipment (not shown). The lumber staging device 2 comprises a first multi-level lumber conveying assembly generally indicated as 6 comprising a plurality of vertically stacked substantially horizontal conveyors each generally indicated as 8 mounted on a corresponding conveyor support frame generally indicated as 10 and a second multi-level conveying assembly generally indicated as 12 comprising a second plurality of vertically stacked substantially horizontal conveyors each generally indicated as 14 mounted on a corresponding conveyor support frame generally indicated as 16 disposed on opposite sides of the lumber stage device 2. The first and second multi-level lumber conveying assemblies 6 and 12 each comprises a first or lower, a second or intermediate and a third or upper substantially horizontal conveyor generally indicated as 8A, 8B, 8C and 14A, 14B, 14C respectively such that the corresponding substantially horizontal conveyors 8A and 14A, 8B and 14B, and 8C and 14C are substantially parallel to each other to cooperatively form a first or lower conveyor assembly, a second or intermediate conveyor assembly and a third upper conveyor assembly respectively to support lumber 4 thereon.

Figure 2:
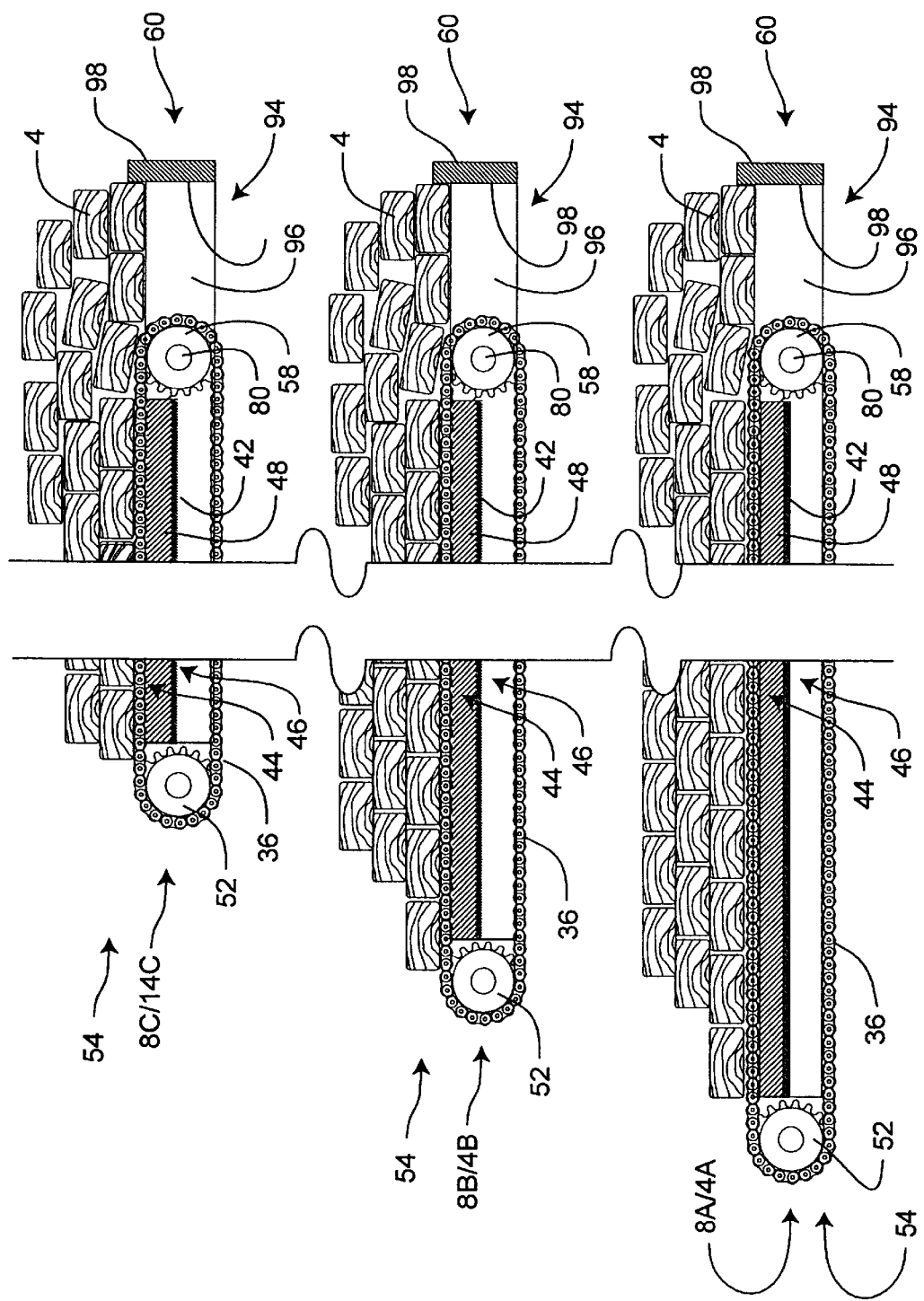
FIG. 2 is a partially side view of the lumber staging device of the present invention.

As shown in FIG. 1, lateral separation between the first or lower substantially horizontal, substantially parallel conveyors 8A and 14A, the second or intermediate substantially horizontal, substantially parallel conveyors 8B and 14B and the third or upper substantially horizontal, substantially parallel conveyors 8C and 14C are different to support lumber of different lengths thereon. As shown, the width of the third or upper conveyor assembly is greater than the width of the second or intermediate conveyor assembly which is greater than the width of the first or lower conveyor assembly, As shown in FIG. 2, the longitudinal dimensions or length of the first or lower substantially horizontal, substantially parallel conveys 8A and 14A is greater than the length of the second or intermediate substantially horizontal, substantially parallel conveyors 8B and 14B which is greater than the length of the third or upper substantially horizontal, substantially parallel conveyors 8C and 14C. Thus, the length of the first or lower conveyor assembly is greater than the length of the second or intermediate conveyor assembly which is greater than the length of the third or upper conveyor assembly.

As best shown in FIG. 1, each conveyor support frame 10 and 16 comprises a plurality of conveyor support subframes each generally indicated as 18. Each conveyor support subframe 18 includes an outer substantially vertical member 20, a plurality of cantilevered substantially horizontal, substantially parallel conveyor mounting members each indicated as 22 corresponding to each conveyor assembly and a plurality of inner substantially parallel support elements each indicated as 24 disposed between the corresponding cantilevered substantially horizontal, substantially parallel mounting members 22. The conveyor support subframes 18 on each side of the lumber staging device 2 are rigidly coupled together by at least one substantially horizontal interconnecting beam 26 and a plurality of substantially diagonal reinforcing members each indicated as 28 cooperatively forming a triangulated structural grid for each conveyor support frame 16. The outer substantially vertical member 20 and a corresponding bottom inner substantially vertical support element 30 are affixed to a floor mounting plate 31 which is attached to the floor 32 with bolts 34 or other fasteners common in the art.

Figure 3:
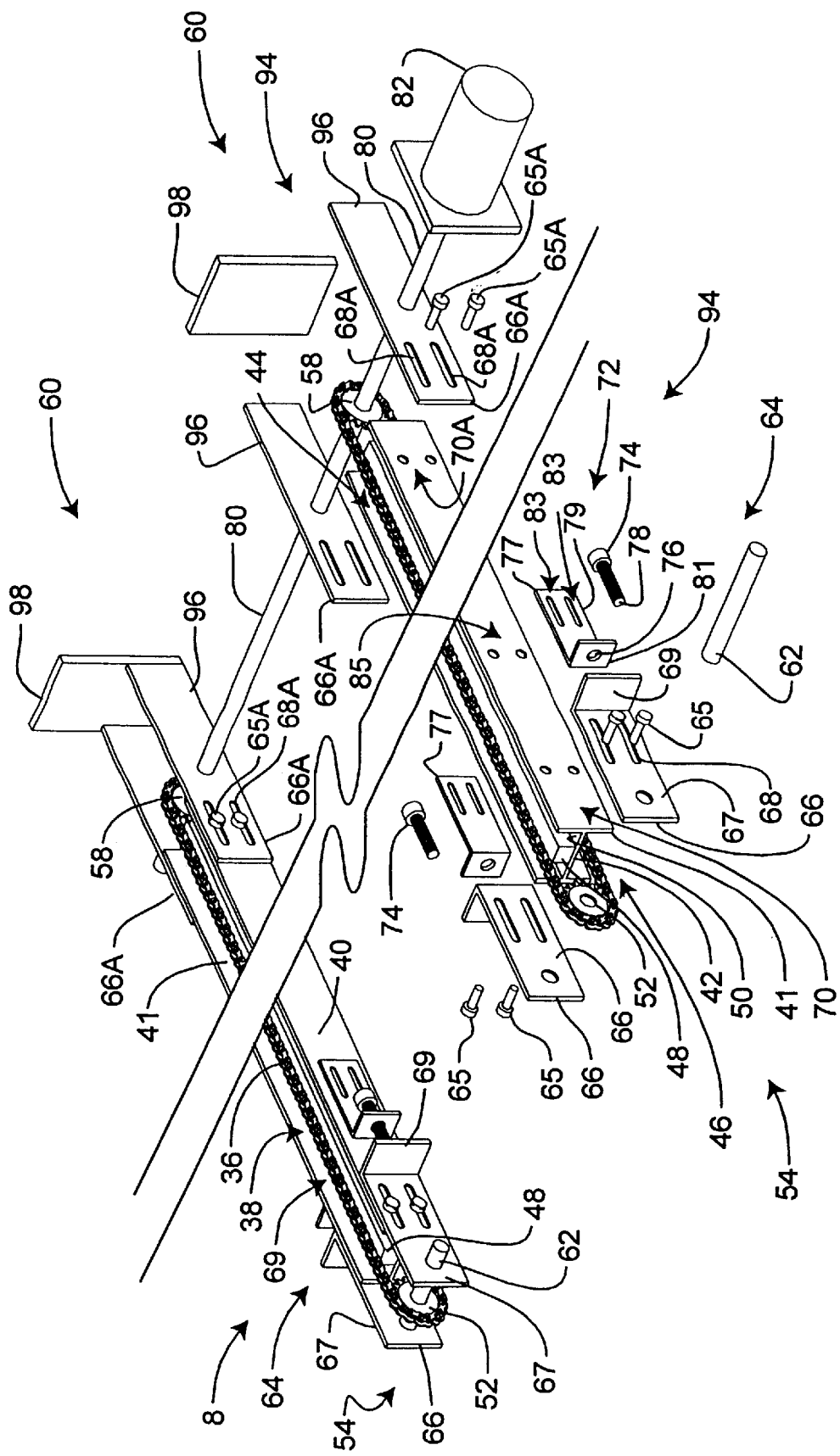
FIG. 3 is an exploded perspective view of a corresponding pair substantially horizontal conveyors of the present invention.

As shown in FIGS. 2 and 3, each substantially horizontal conveyor 8 in the first multi-level lumber conveying assembly 6 and the corresponding substantially horizontal conveyor 14 in the second multi-level lumber conveying assembly 12 are affixed in spaced relationship relative to each other to cooperatively for the first or lower conveyor assembly, the second or intermediate conveyor assembly and the third or upper assembly. Each substantially horizontal conveyor 8 and the corresponding substantially horizontal conveyor 14 includes a lumber conveying chain 36 operatively coupled to a corresponding conveying assembly generally indicated as 38. As best shown in FIG. 3, each conveying assembly 38 comprises an inner substantially vertical flange 40 and a corresponding outer substantially vertical flange 41 held in substantially parallel spaced relationship relative to each other by a substantially horizontal interconnecting member 42 to cooperatively form a corresponding upper convey channel 44 and a corresponding lower chain return channel 46 therebetween. Each outer substantially vertical flange 41 is affixed to a corresponding cantilevered substantially horizontal conveyor mounting member 22 at the center portion and each end portion thereof Each lumber conveying chain 36 is supported by a support rail 48 formed on the upper surface 50 of the substantially horizontal intermediate member 42 within the corresponding upper conveying channel 44. Each lumber conveying chain 36 operatively engages a positioning sprocket 52 disposed at the lumber receiving end portion 54 of the conveying assembly 38 and a drive sprocket 58 disposed at the lumber discharge end portion 60 of the conveying assembly 38. Each positioning sprocket 52 is affixed to a shaft 62 rotatably received by a positioning sprocket support assembly generally indicated as 64 disposed on opposite sides of the corresponding conveying assembly 38. Each positioning sprocket support assembly 64 includes a substantially L-shaped sprocket support plate 66 including a mounting plate member 67 slidably coupled to the outer surface of the inner vertical flange 40 and the outer surface of the outer vertical flange 41 of the conveying assembly 38 on the corresponding shaft 62 and a flange member 69. The sprocket support assemblies 64 are selectively retained in position by bolts 65 received by a corresponding substantially horizontal slot 68 formed in the mounting plate member 67 and an opening 70 formed in the inner substantially vertical flange 40 and the outer substantially vertical flange 41 thereof.

Each positioning sprocket support assembly 64 further includes a sprocket positioning member generally indicated as 72 comprising a threaded member 74 disposed within a threaded opening 76 formed in a substantially L-shaped sprocket positioning plate generally indicated as 77 including a positioning plate member 79 and a flange member 81 extending outwardly therefrom attached to the inner substantially vertical flange 40 and the outer substantially vertical flange 41 by slots 83 formed in the positioning plate member 79 and apertures 85 by bolts 87 and a flange member 89 extending outwardly therefrom. The distal end 78 of the threaded member 74 operatively engages the flange member 69 of the sprocket support plate 66 such that the selective rotation of the threaded member 74 through the threaded opening 76 of the corresponding sprocket support assembly 64 moves of the shaft 62 and the positioning sprocket 52 relative to the lumber receiving end portion 54 adjusting the lumber support chain 36 relative to the conveying assembly 38.

Corresponding drive sprockets 58 for each substantially horizontal conveyor 8 and the corresponding substantially horizontal conveyor 14 are affixed to opposite end portions of a corresponding drive shaft 80 received by a pair of drive sprocket support plates 66A formed on the lumber discharge end 60 of the conveying assembly 38. Each drive sprocket support plate 66A is attached to the substantially vertical flange 40 by bolts 65A received by slotted openings 68A in the drive sprocket support plate 66 and by corresponding threaded openings (not shown) formed in the surface of the substantially vertical flange 40. The drive shaft 80 is operatively coupled to a motor 82 mounted on a plate 83 formed on the outer vertical support member 20 on the first multi-level lumber conveying assembly 6. The motor 82 is operatively coupled to a power source such as a pump (not shown) through hydraulic conduits 84 and a corresponding valve 86 mounted on the outer vertical support member 20 adjacent to the motor 82. When the valve 86 is opened, high-pressure hydraulic fluid is introduced to the corresponding hydraulic motor 82 rotating the corresponding drive shaft 80. With the rotation of the drive shaft 80, the lumber conveying chains 36 on the corresponding substantially horizontal conveyors 8 and 14 move over the corresponding conveyor assembly 38 such that lumber 4 supported therebetween is moved from lumber receiving station at the lumber receiving end 54 to the lumber discharge station at the lumber discharge end 60.

In use, the lumber staging device 2 is positioned adjacent an automated saw such that lumber 4 is loaded into the lumber staging device 2 in the same orientation required for loading into the saw with the operator standing between the saw and the lumber discharge end 60 of the substantially horizontal conveyors 8 and 14. Bundles of lumber 4 are removed from a stockpile and placed on corresponding multi-level pairs of substantially horizontal conveyors 8A/14A, 8B/14B and 8C/14C at the lumber receiving end 54 of the lumber staging device 2. As lumber 4 accumulates on any of the multi-level pairs of substantially horizontal conveyors 8A/14A, 8B/14B and 8C/14C, the operator periodically actuates the hydraulic valve 86 thereby actuating the hydraulic motor 82 to move the lumber 4 along the length of the corresponding substantially horizontal conveyors 8 and 14 towards the lumber discharge end 92 of the lumber staging device 2. As lumber 4 reaches the lumber discharge end 92 of the lumber staging device 2, the lumber 4 is ejected or dropped from the lumber conveying chains 36 and onto a lumber discharge station 94 including a substantially horizontal lumber support member 96 extending outward from the conveying assemblies 38.

Lumber 4 ejected from the lumber support chain 36 slides across the upper surface of the lumber support member 96 until engaging a substantially vertical lumber retaining member 98 formed on the distal end of the lumber support member 96. As lumber 4 is required for the use with the automated saw, the operator simply removes the necessary pieces from the opposite lumber discharge station 94 by hand and into the saw (not shown).

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A lumber staging device having a lumber receiving station and a lumber discharge station disposed at opposite end portions thereof for positioning a supply of lumber of different lengths within arms reach of an operator of an automated saw comprising a first multi-level lumber conveying assembly including a first set of conveyors disposed on one side portion of said lumber staging device and a second multi-level lumber conveying assembly including a second set of conveyors disposed on opposite side portions of said lumber staging device cooperatively forming multi-level pairs of corresponding conveyors disposed on opposite side portions of said lumber staging device to convey lumber supported respectively thereon, each said pair of corresponding conveyors is operatively coupled to a corresponding conveyor drive to selectively convey lumber supported therebetween from said lumber receiving station to said lumber discharge station each said pair of corresponding conveyors being spaced apart such that lumber is supported across the width of said lumber staging device to allow removal thereof transversely of the length.

2. The lumber staging device of claim 1 wherein the width of said upper conveyor assembly is greater than the width of said lower conveyor assembly.

3. A lumber staging device in claim 1 wherein each conveyor support frame comprises a plurality of conveyor support subframes included an outer substantially vertical member, a plurality of cantilevered substantially horizontal, substantially parallel conveyor mounting members corresponding to each said conveyor assembly and a plurality of inner substantially parallel support elements disposed between the corresponding cantilevered substantially horizontal, substantially parallel mounting members.

4. A lumber staging device in claim 3 wherein on each side of the lumber staging device is coupled together by at least one substantially horizontal interconnecting beam and a plurality of substantially diagonal reinforcing members cooperatively forming a triangulated structural grid for each conveyor support frame.

5. A lumber staging device in claim 4 wherein an outer substantially vertical member and a corresponding bottom inner substantially vertical support element are affixed to a floor mounting plate which is attached to the floor.

6. A lumber staging device in claim 1 wherein said multi-level pairs of corresponding conveyors comprise to cooperatively form a lower conveyor assembly and an upper conveyor assembly respectively to support lumber thereon.

7. The lumber staging device of claim 6 wherein the lateral separation between said lower conveyor assembly and upper conveyor assembly is different to support lumber of different lengths thereon.

8. A lumber staging device in claim 1 wherein each conveyor support frame comprises a plurality of conveyor support subframes included an outer substantially vertical member, a plurality of cantilevered substantially horizontal, substantially parallel conveyor mounting members corresponding to each said conveyor assembly and a plurality of inner substantially parallel support elements disposed between the corresponding cantilevered substantially horizontal, substantially parallel mounting members.

9. The lumber staging device of claim 1 wherein said multi-level pairs of corresponding conveyors further comprise an intermediate conveyor assembly disposed between said lower conveyor assembly and said upper conveyor assembly.

10. The lumber staging device of claim 9 wherein the width of said upper conveyor assembly is greater than the width of said intermediate conveyor assembly which is greater than the width of said lower conveyor assembly.

11. The lumber staging device of claim 10 wherein the length of said lower conveyor assembly is greater than the length of said intermediate conveyor assembly which is greater than the length of said upper conveyor assembly.

12. The lumber staging device of claim 9 wherein the length of said lower conveyor assembly is greater than the length of said intermediate conveyor assembly which is greater than the length of said upper conveyor assembly.

13. The lumber staging device of claim 12 wherein the width of said upper conveyor assembly is greater than the width of said intermediate conveyor assembly which is greater than the width of said lower conveyor assembly.

14. A lumber staging device in claim 1 wherein each said substantially horizontal conveyor in the first multi-level lumber conveying assembly and the corresponding substantially horizontal conveyor in the second multi-level lumber conveying assembly are affixed in spaced relationship relative to each other.

15. A lumber staging device in claim 14 wherein each said substantially horizontal conveyor includes a lumber conveying chain operatively coupled to a corresponding conveying assembly.

16. A lumber staging device in claim 15 wherein each lumber conveying chain operatively engages a positioning sprocket disposed at the lumber receiving end portion of the conveying assembly and a drive sprocket disposed at the lumber discharge end portion of the conveying assembly, Each positioning sprocket is affixed to a shaft rotatably received by a sprocket support assembly generally indicated as disposed on opposite sides of the corresponding conveying assembly.

17. A lumber staging device in claim 16 wherein each sprocket support assembly includes a substantially L-shaped sprocket support plate including a mounting plate member slidably coupled to the outer surface of the inner vertical flange and the outer surface of the outer vertical flange of the conveying assembly on the corresponding shafts; the sprocket support assemblies are selectively retained in position by bolts received by a corresponding substantially horizontal slot formed in the mounting plate member and a threaded opening formed in the inner substantially vertical flange or outer substantially vertical flange thereof.

18. A lumber staging device in claim 17 wherein each sprocket support assembly further includes a sprocket positioning member.

19. A lumber staging device in claim 18 wherein comprising a threaded member disposed within a threaded opening formed in a substantially L-shaped sprocket positioning plate including a positioning plate member and a flange member extending outwardly therefrom attached to the inner substantially vertical flange of the outer substantially vertical flange by slots formed in the positioning plate member and apertures by bolts and a flange member extending outwardly therefrom; the distal end of the threaded member operatively engages the flange member of the sprocket support plate such that the selective rotation of the threaded member through the threaded opening of the corresponding sprocket support assembly moves of the shaft and the positioning sprocket relative to the lumber receiving end portion adjusting the lumber support chain relative to the conveying assembly.

20. A lumber staging device in claim 17 wherein each sprocket support assembly further includes a sprocket positioning member.

21. A lumber staging device in claim 16 wherein corresponding drive sprockets for each substantially horizontal conveyor and the corresponding substantially horizontal conveyor are affixed to opposite end portions of a corresponding drive shaft, The drive shaft is operatively coupled to a motor.

22. A lumber staging device in claim 21 wherein with the rotation of the drive shaft, the lumber conveying chains on the corresponding substantially horizontal conveyor move over the conveyor assemblies such that lumber supported therebetween is moved from lumber receiving station at the lumber receiving end to the lumber discharge station at the lumber discharge end.

23. A lumber staging device having a lumber receiving station and a lumber discharge station for positioning a supply of lumber of different lengths within arms reach of an operator of an automated saw comprising a first multi-level lumber conveying assembly including a first set of conveyors and a second multi-level lumber conveying assembly including a second set of conveyors cooperatively forming multi-level pairs of corresponding conveyors to convey lumber supported respectively thereon, each said pair of corresponding conveyors is operatively coupled to a conveyor drive to selectively convey lumber supported therebetween from said lumber receiving station to said lumber discharge station, each said substantially horizontal conveyor in the first multi-level lumber conveying assembly and the corresponding substantially horizontal conveyor in the second multi-level lumber conveying assembly are affixed in spaced relationship relative to each other, each conveying assembly comprises an inner substantially vertical flange and a corresponding outer substantially vertical flange held in substantially parallel spaced relationship relative to each other by a substantially horizontal interconnecting member to cooperatively form a corresponding upper convey channel and a corresponding lower chain return channel therebetween and each said outer substantially vertical flange is affixed to a corresponding cantilevered substantially horizontal conveyor mounting member at the center portion and each end portion thereof.

24. A lumber staging device in claim 23 wherein each lumber conveying chain is supported by a support rail formed on the upper surface of the substantially horizontal intermediate member within the corresponding upper conveying channel.

* * * * *